US012676897B2

(12) United States Patent
Bailey et al.

(10) Patent No.: US 12,676,897 B2
(45) Date of Patent: Jul. 7, 2026

(54) SYSTEMS AND METHODS FOR APPLYING POLICIES IN A DATACENTER ENVIRONMENT

(71) Applicant: Business Technology Architects, Inc., Alpharetta, GA (US)

(72) Inventors: Jerry Bailey, Alpharetta, GA (US); Dana Blair, Alpharetta, GA (US); David Buechner, Alpharetta, GA (US); Kenneth R. Fee, Alpharetta, GA (US)

(73) Assignee: Business Technology Architects, Inc., Alpharetta, GA (US)

( * ) Notice: Subject to any disclaimer, the term of this patent is extended or adjusted under 35 U.S.C. 154(b) by 34 days.

(21) Appl. No.: 18/812,568

(22) Filed: Aug. 22, 2024

(65) Prior Publication Data

US 2025/0071149 A1    Feb. 27, 2025

Related U.S. Application Data

(60) Provisional application No. 63/534,072, filed on Aug. 22, 2023.

(51) Int. Cl.
H04L 9/40         (2022.01)

(52) U.S. Cl.
CPC .......... H04L 63/20 (2013.01); H04L 63/0236 (2013.01)

(58) Field of Classification Search
CPC . H04L 63/20; H04L 63/0236; H04L 41/0895; H04L 43/16; H04L 43/20
See application file for complete search history.

(56) References Cited

U.S. PATENT DOCUMENTS

| | | | |
|---|---|---|---|
| 2007/0192823 A1* | 8/2007 | Andersen ............ | H04L 41/0894 |
| | | | 726/1 |
| 2016/0359891 A1* | 12/2016 | Pang ................... | G06F 9/45558 |
| 2023/0112579 A1* | 4/2023 | Parenti ............... | H04L 41/0895 |
| | | | 709/220 |
| 2024/0121150 A1* | 4/2024 | Belton, Jr. .......... | H04L 41/0816 |

* cited by examiner

*Primary Examiner* — Noura Zoubair
*Assistant Examiner* — Lawrence Q Truong
(74) *Attorney, Agent, or Firm* — Baker Donelson

(57)        ABSTRACT

A method is described herein comprising one or more applications running on at least one processor for segmenting applications in a networked environment, the one or more applications communicatively coupled with the applications, the one or more applications providing receiving network flow information of the applications from at least one source, using the network flow information to discover a plurality of policies in a first policy enforcement environment, receiving the discovered plurality of policies in a first format according to a first policy naming convention, mapping the discovered plurality of policies from the first format to a second format following a second policy naming convention, enforcing at least a portion of the discovered plurality of policies in the first policy enforcement environment using the first format, and enforcing at least a portion of the discovered plurality of policies in a second policy enforcement environment using the second format.

29 Claims, 17 Drawing Sheets

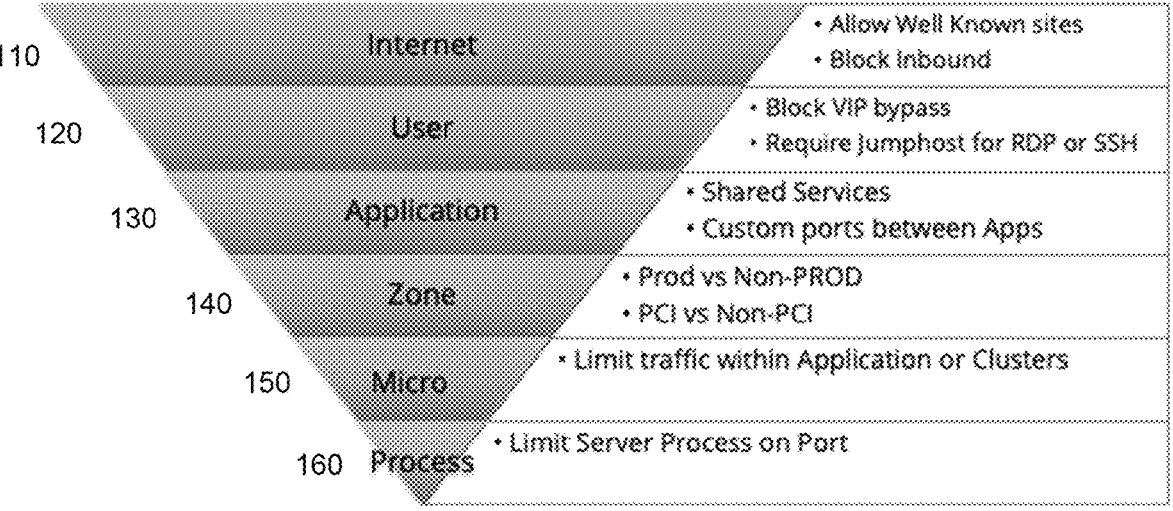

Zero Trust Segmentation Hierarchy

| Label | Segment | Description |
|---|---|---|
| 110 | Internet | • Allow Well Known sites<br>• Block Inbound |
| 120 | User | • Block VIP bypass<br>• Require Jumphost for RDP or SSH |
| 130 | Application | • Shared Services<br>• Custom ports between Apps |
| 140 | Zone | • Prod vs Non-PROD<br>• PCI vs Non-PCI |
| 150 | Micro | • Limit traffic within Application or Clusters |
| 160 | Process | • Limit Server Process on Port |

Figure 1

| Application | Policy Type | Priority | Action | Combined Filter |
|---|---|---|---|---|
| DC1-COMMON | Absolute Policies | 100 | ALLOW | BTAPOV:INTERNAL:DC1:FABRIC1:SHARED_SERVICES:SCANNER-AP |
| DC1-COMMON | Absolute Policies | 100 | ALLOW | BTAPOV:INTERNAL |
| DC1-COMMON | Absolute Policies | 100 | ALLOW | BTAPOV:INTERNAL |
| DC1-COMMON | Absolute Policies | 100 | ALLOW | BTAPOV:INTERNAL |
| DC1-COMMON | Absolute Policies | 100 | ALLOW | BTAPOV:INTERNAL |
| DC1-COMMON | Absolute Policies | 100 | ALLOW | BTAPOV:INTERNAL |
| DC1-COMMON | Absolute Policies | 100 | ALLOW | BTAPOV:INTERNAL |
| DC1-COMMON | Absolute Policies | 100 | ALLOW | BTAPOV:INTERNAL |
| DC1-COMMON | Absolute Policies | 100 | ALLOW | BTAPOV:INTERNAL |
| DC1-COMMON | Absolute Policies | 100 | ALLOW | BTAPOV:INTERNAL:DC1 |
| DC1-COMMON | Absolute Policies | 100 | ALLOW | BTAPOV:INTERNAL |
| DC1-COMMON | Absolute Policies | 100 | ALLOW | BTAPOV:INTERNAL |
| DC1-COMMON | Absolute Policies | 100 | ALLOW | BTAPOV:INTERNAL |
| APP1-PROD | Default Policies | 100 | ALLOW | BTAPOV:INTERNAL:DC1:FABRIC1:TENANT1:APP1-AP |
| APP1-PROD | Default Policies | 100 | ALLOW | DC1-FABRIC1-TENANT1-APP1-APP-EPG |
| APP1-PROD | Default Policies | 100 | ALLOW | DC1-FABRIC1-TENANT1-APP1-APP-EPG |
| APP1-PROD | Default Policies | 100 | ALLOW | DC1-FABRIC1-TENANT1-APP1-WEB-EPG |
| APP1-PROD | Default Policies | 100 | ALLOW | BTAPOV:INTERNAL:DC1:FABRIC1:TENANT1:APP1-AP |
| APP1-PROD | Default Policies | 100 | ALLOW | BTAPOV:INTERNAL |
| APP1-PROD | Default Policies | 100 | ALLOW | DC1-FABRIC1-TENANT1-APP1-APP-EPG |

Figure 11A

| Consumer Type | Provider Filter | Provider Type |
|---|---|---|
| Scope | BTAPOV:INTERNAL | Scope |
| Scope | BTAPOV:INTERNAL:DC1:FABRIC1:SHARED_SERVICES:DOMAIN_CONTROLLER-AF:Scope | Scope |
| Scope | BTAPOV:INTERNAL:DC1:FABRIC1:SHARED_SERVICES:DOMAIN_CONTROLLER-AF:Scope | Scope |
| Scope | BTAPOV:INTERNAL:DC1:FABRIC1:SHARED_SERVICES:DOMAIN_CONTROLLER-AF:Scope | Scope |
| Scope | BTAPOV:INTERNAL:DC1:FABRIC1:SHARED_SERVICES:DOMAIN_CONTROLLER-AF:Scope | Scope |
| Scope | BTAPOV:INTERNAL:DC1:FABRIC1:SHARED_SERVICES:DOMAIN_CONTROLLER-AF:Scope | Scope |
| Scope | BTAPOV:INTERNAL | Scope |
| Scope | BTAPOV:INTERNAL | Scope |
| Scope | BTAPOV:INTERNAL | Scope |
| Scope | BTAPOV:INTERNET-L3OUT | Scope |
| Scope | BTAPOV:INTERNAL:DC1:FABRIC1:SHARED_SERVICES:DOMAIN_CONTROLLER-AF:Scope | Scope |
| Scope | BTAPOV:INTERNAL:DC1:FABRIC1:SHARED_SERVICES:DOMAIN_CONTROLLER-AF:Scope | Scope |
| Scope | BTAPOV:INTERNAL:DC1:FABRIC1:SHARED_SERVICES:DOMAIN_CONTROLLER-AF:Scope | Scope |
| Scope | DC1-FABRIC1-TENANT1-APP1-WEB-EPG | Cluster |
| Cluster | BTAPOV:INTERNET-L3OUT | Scope |
| Cluster | DC1-FABRIC1-TENANT1-APP1-APP-EPG | Cluster |
| Cluster | DC1-FABRIC1-TENANT1-APP1-APP-EPG | Cluster |
| Scope | BTAPOV:INTERNET-L3OUT | Scope |
| Scope | DC1-FABRIC1-TENANT1-APP1-WEB-EPG | Cluster |
| Cluster | DC1-FABRIC1-TENANT1-APP1-DB-EPG | Cluster |

Figure 11B

| Protocol | Port | Service | Approved | Done | Recommend |
|---|---|---|---|---|---|
| Any | Any | | Yes | | |
| TCP | 53 | DNS | Yes | | |
| UDP | 53 | DNS | Yes | | |
| TCP | 88 | Kerberos | Yes | | |
| UDP | 123 | NTP | Yes | | |
| TCP | 135 | RPC Endpoint Mapper | Yes | | |
| UDP | 137 | NETBIOS Name Service | Yes | | |
| UDP | 138 | NetBIOS Datagram Service | Yes | | |
| TCP | 139 | NETBIOS Session Service | Yes | | |
| TCP | 443 | HTTPS | Yes | | |
| TCP | 445 | Microsoft-ds | Yes | | |
| TCP | 464 | Kerberos Password V5 | Yes | | |
| TCP | 49152-65535 | | Yes | | |
| TCP | 80 | HTTP | Yes | | |
| TCP | 80 | HTTP | Yes | | |
| TCP | 80 | HTTP | Yes | | |
| TCP | 80 | HTTP | Yes | | |
| UDP | 123 | NTP | Yes | | |
| TCP | 443 | HTTPS | Yes | | |
| TCP | 3306 | | Yes | | |

Figure 11C

| Validate | Actions | CSV Policy |
|---|---|---|
| VALID | IGNORE ALL CONFIGURED | BTAPOV:INTERNAL.DC1:FABRIC1:SHARED_SERVICES:SCANNER-AP to BTAPOV:INTERNAL on Any Any |
| VALID | IGNORE ALL CONFIGURED | BTAPOV:INTERNAL.DC1:FABRIC1:SHARED_SERVICES:SCANNER-AP to BTAPOV:INTERNAL on Any Any |
| VALID | IGNORE ALL CONFIGURED | BTAPOV:INTERNAL to BTAPOV:INTERNAL.DC1:FABRIC1:SHARED_SERVICES:DOMAIN_CONTROLLER-AP on TCP 53 |
| VALID | IGNORE ALL CONFIGURED | BTAPOV:INTERNAL to BTAPOV:INTERNAL.DC1:FABRIC1:SHARED_SERVICES:DOMAIN_CONTROLLER-AP on TCP 53 |
| VALID | IGNORE ALL CONFIGURED | BTAPOV:INTERNAL to BTAPOV:INTERNAL.DC1:FABRIC1:SHARED_SERVICES:DOMAIN_CONTROLLER-AP on UDP 53 |

Figure 12A

| Parent | Filter Name | Filter Entry | Contract |
|---|---|---|---|
| dc1fabric1-shared_services | any-filt | any-entry | vzany-ct |
| dc1fabric1-shared_services | | | vzany-ct |
| dc1fabric1-shared_services | tcp-53-filt | tcp-53-entry | dc1fabric1-shared_services-domain_controller-ct |
| dc1fabric1-shared_services | | | dc1fabric1-shared_services-domain_controller-ap-ct |
| dc1fabric1-shared_services | udp-53-filt | udp-53-entry | dc1fabric1-shared_services-domain_controller-ap-ct |

Figure 12B

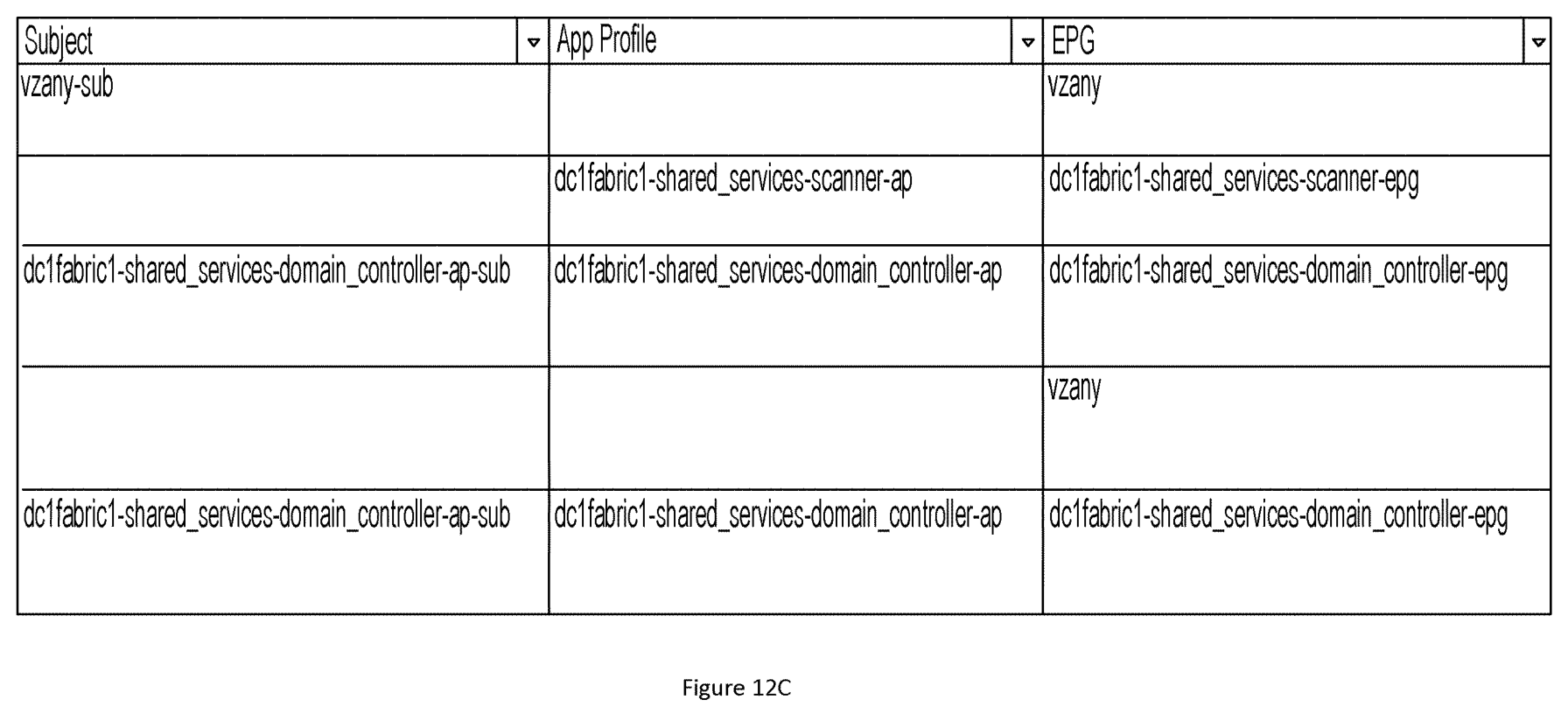

| Subject | App Profile | EPG |
|---|---|---|
| vzany-sub | | vzany |
| | dc1fabric1-shared_services-scanner-ap | dc1fabric1-shared_services-scanner-epg |
| dc1fabric1-shared_services-domain_controller-ap-sub | dc1fabric1-shared_services-domain_controller-ap | dc1fabric1-shared_services-domain_controller-epg |
| | | vzany |
| dc1fabric1-shared_services-domain_controller-ap-sub | dc1fabric1-shared_services-domain_controller-ap | dc1fabric1-shared_services-domain_controller-epg |

Figure 12C

| Consumed or Provided | Workspace | Description |
|---|---|---|
| provided | DC1-COMMON | Unenforced BTAPOV:INTERNAL:DC1:FABRIC1:SHARED_SERVICES:SCANNER-AP to BTAPOV:INTERNAL on Any Any |
| consumed | DC1-COMMON | Unenforced BTAPOV:INTERNAL:DC1:FABRIC1:SHARED_SERVICES:SCANNER-AP to BTAPOV:INTERNAL on Any Any |
| provided | DC1-COMMON | Unenforced BTAPOV:INTERNAL to BTAPOV:INTERNAL:DC1:FABRIC1:SHARED_SERVICES:DOMAIN_CONTROLLER-AP on TCP 53 |
| consumed | DC1-COMMON | Unenforced BTAPOV:INTERNAL to BTAPOV:INTERNAL:DC1:FABRIC1:SHARED_SERVICES:DOMAIN_CONTROLLER-AP on TCP 53 |
| provided | DC1-COMMON | Unenforced BTAPOV:INTERNAL to BTAPOV:INTERNAL:DC1:FABRIC1:SHARED_SERVICES:DOMAIN_CONTROLLER-AP on UDP 53 |

Figure 12D

SYSTEMS AND METHODS FOR APPLYING POLICIES IN A DATACENTER ENVIRONMENT

RELATED APPLICATION

This application claims the benefit of U.S. Application No. 63/534,072, filed Aug. 22, 2024.

TECHNICAL FIELD

The present disclosure relates to systems that implement security policies for securing access to applications operating within enterprises datacenters. More particularly, the present disclosure relates to discovery, management, and enforcement of policies for securing datacenter applications.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BACKGROUND

At its simplest, a data center is a physical facility that organizations use to house their critical applications and data. A data center's design is based on a network of computing and storage resources that enable the delivery of shared applications and data. The key components of a data center design include routers, switches, firewalls, storage systems, servers, and application-delivery controllers.

Data center security follows the workload across physical data centers and multicloud environments to protect applications, infrastructure, data, and users. The practice applies to traditional data centers based on physical servers to more modern data centers based on virtualized servers. It also applies to data centers in the public cloud.

Data centers contain a majority of a company's information assets and intellectual property. These are the primary focus of all targeted attacks, and therefore require a high level of security. Data centers contain complex networks of servers and applications. Creating and managing proper security rules to control access among datacenter resources can be exceptionally difficult.

BRIEF DESCRIPTION OF THE FIGURES

FIG. 1 shows a zero trust segmentation hierarchy, under an embodiment.

FIGS. 11A-11C show policies for mapping from CSW to ACI environment, under an embodiment.

FIGS. 12A-12D show ACI contracts, under an embodiment.

DETAILED DESCRIPTION

Figure 2:
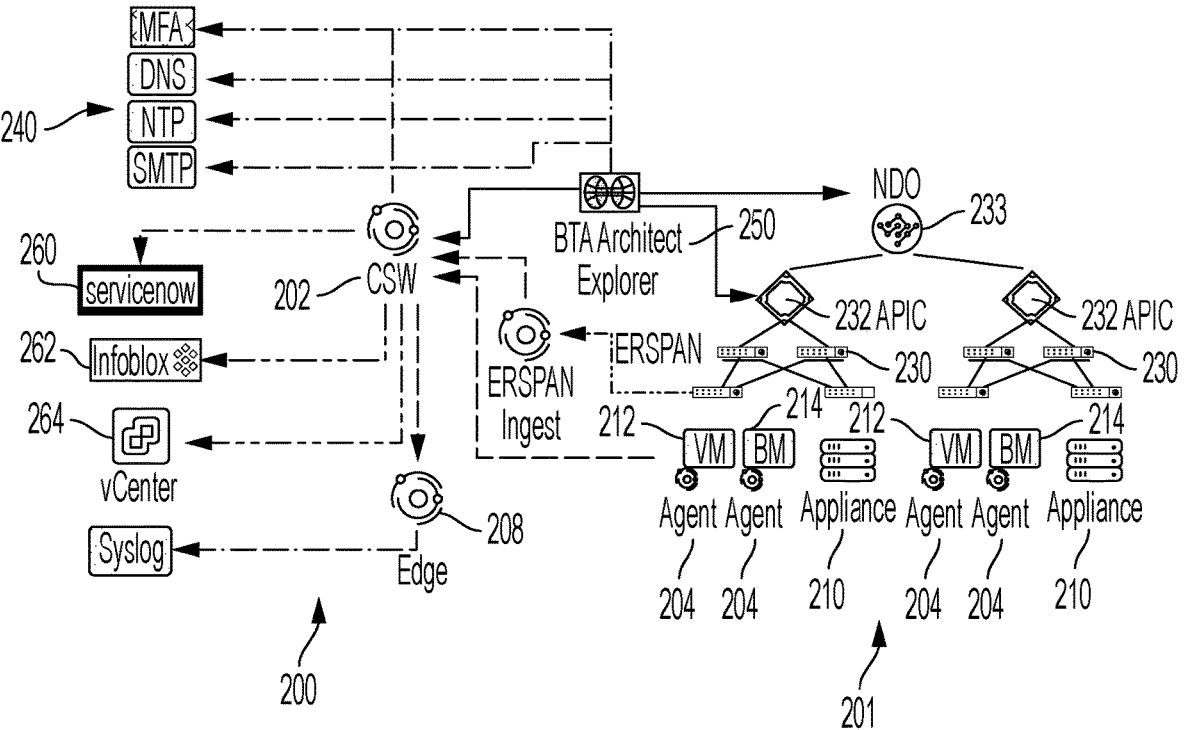
FIG. 2 shows workflow and environment of a policy discovery, management and enforcement solution, under an embodiment.

Companies operates data centers that contain hundreds to thousands of physical and virtual servers that are segmented by application type, data classification zone, and other methods. Therefore, companies implement security architectures to control access to (north/south) and between (east/west) resources.

Enterprise policy enforcement tools may include a Cisco Secure Workload (CSW) solution or a Cisco Application Centric Infrastructure (ACI). Business Technology Architects (BTA) implements a security architecture that integrates both solutions. A company may engage Business Technology Architects (BTA) to create and document an architecture for microsegmenting their datacenter applications using Cisco Secure Workload (CSW), Cisco Application Centric Infrastructure (ACI), a BTA Policy Automation Engine (PAE) in BTA Architect Explorer (BTA AE). PAE integrates CSW with ACI to automatically enforce policy from CSW into ACT. The BTA PAE running in BTA AE assists network, system, application and security engineers and management in understanding Microsegmentation architecture and how to execute it.

Zero Trust requires hierarchical Internet, User, Application, Zone, and Micro segmentation in the datacenter. This hierarchy provides visibility to dependencies within each layer and between layers using the business language of the organization instead of networking objects such as addresses or vlans. With the policy in the language of the business, it can be more easily reviewed and approved. Once approved and enforced, the policy limits traffic to only what is needed for application operation and management. All other traffic is dropped, preventing proliferation east/west within the datacenter. This architecture works in concert with Perimeter Firewall enforcement which drops unneeded north/south traffic to limit or prevent intrusion from outside the datacenter.

FIG. 1 shows a zero trust segmentation hierarchy, under an embodiment. Layer 110 comprises the internet layer. The internet layer, or Layer 3 in the OSI model, is responsible for routing data packets across different networks. It deals with IP addresses, routing protocols, and logical addressing. Data packets are inspected and authorized at the internet layer based on the established security policies, regardless of their origin or destination. This means that even traffic that traverses the traditional network perimeter or originates from external sources is subject to stringent security measures before being allowed to access critical resources.

Zero trust segmentation at the user level 120 aims to ensure that every user, regardless of their location or device, must continuously authenticate and prove their identity before gaining access to specific resources, applications, or data. At user layer 120, an architecture may block VIP bypass and require a jumphost for secure shell (SSH) and remote desktop protocol (RDP). A jumphost serves as a single point of entry between different segments of a network. Often privileged resources on the network are hidden behind a jumphost, such that users cannot access the resources directly from their workstations. Instead, a user must connect to the jumphost and then to the privileged resource.

Zero trust microsegmentation at the application level 130 leverages dependencies between different applications (through application dependency mapping) for implementing effective microsegmentation at the application layer. Application dependency mapping provides insights into how applications interact and communicate with each other, enabling security teams to create accurate and secure segmentation policies.

Zero trust microsegmentation at the zone level 140 involves dividing the network into isolated segments or zones, each dedicated to specific business functions, applications, or user groups. Such grouping may comprise production versus non-production or PCI v. non-PCI. Each zone is protected by its own security policies, and communication between zones is restricted based on established rules.

Zero trust microsegmentation at the zone level 150 involves limiting traffic within applications or clusters.

Zero trust microsegmentation at the process level 160 comprises limiting server process on ports.

The CSW ACI Microsegmentation architecture enforces segmentation policy in linux, windows, and AIX servers and in ACI contracts. The policy is discovered using Application Dependency Mapping (ADM) based on flows ingested into the CSW platform from CSW agents in the servers or Encapsulated Remote Switch Port Analyzer (ERSPAN) export from the ACI switches. The Policy Lifecycle identifies all the steps necessary to discover, approve, analyze, and enforce the policy. Depending on the application segmented, the Policy Enforcement Points (PEPs) will be in the host firewall, ACI contracts, or both. The BTA Policy Automation Engine (PAE) in Architect Explorer (AE) automates the policy enforcement in ACI to ensure that host firewall and ACI policies are consistent.

FIG. 2 shows that the BTA Architect Explorer 250 (running BTA PAE) resides between a CSW environment 200 and an Application Centric Infrastructure environment 201.

Cisco Secure Workload

The CSW environment comprises the CSW platform 202 and agents 204. Cisco Secure Workload (CSW) supports microsegmentation by implementing the Policy Life Cycle for host based firewalls in Windows, Linux, and AIX operating systems. CSW is an agent-based platform requiring agents deployed to the servers (workloads) to report flow data and apply policy to the local host based firewall.

Agents are software components deployed on servers and endpoints within a datacenter. These agents collect and send flow data to the Cisco Secure Workload platform which may then use it to perform application dependency mapping (ADM). True to its name application dependency mapping discovers and visualizes dependencies among datacenter workloads.

Workloads can be simple or complex applications running on one or more servers with thousands of client systems connected and interacting with the application servers across a vast network. Workloads can depend on other shared assets or larger platforms but should have defined boundaries regarding the dependent assets and the processes that depend upon the workloads. Workloads can be visualized by monitoring network traffic among datacenter assets.

Agents provide network flow information. CSW may then analyze this information to discover dependencies. Such network flow information includes packet metadata, process details, software packages, events, etc.

Under one embodiment, ADM leverages knowledge organization structure using scopes and labels. Specifically, labels may be applied to workloads. Scopes then use labels to group workloads. A workspace encompasses grouping of scopes at various levels within a hierarchy. A level may included multiple scopes. And each scope may be a parent to multiple child scopes which further segment workloads at a lower level. Accordingly CSW provides horizontal and vertical segmentation of workloads in a hierarchy. Application dependency mapping is applied to a workspace to provide interdependencies among workloads in a workspace and suggests policies in view of data flows and organizational structure of the scopes. Further, administrators may use results of the ADM to create policies.

Figure 3:
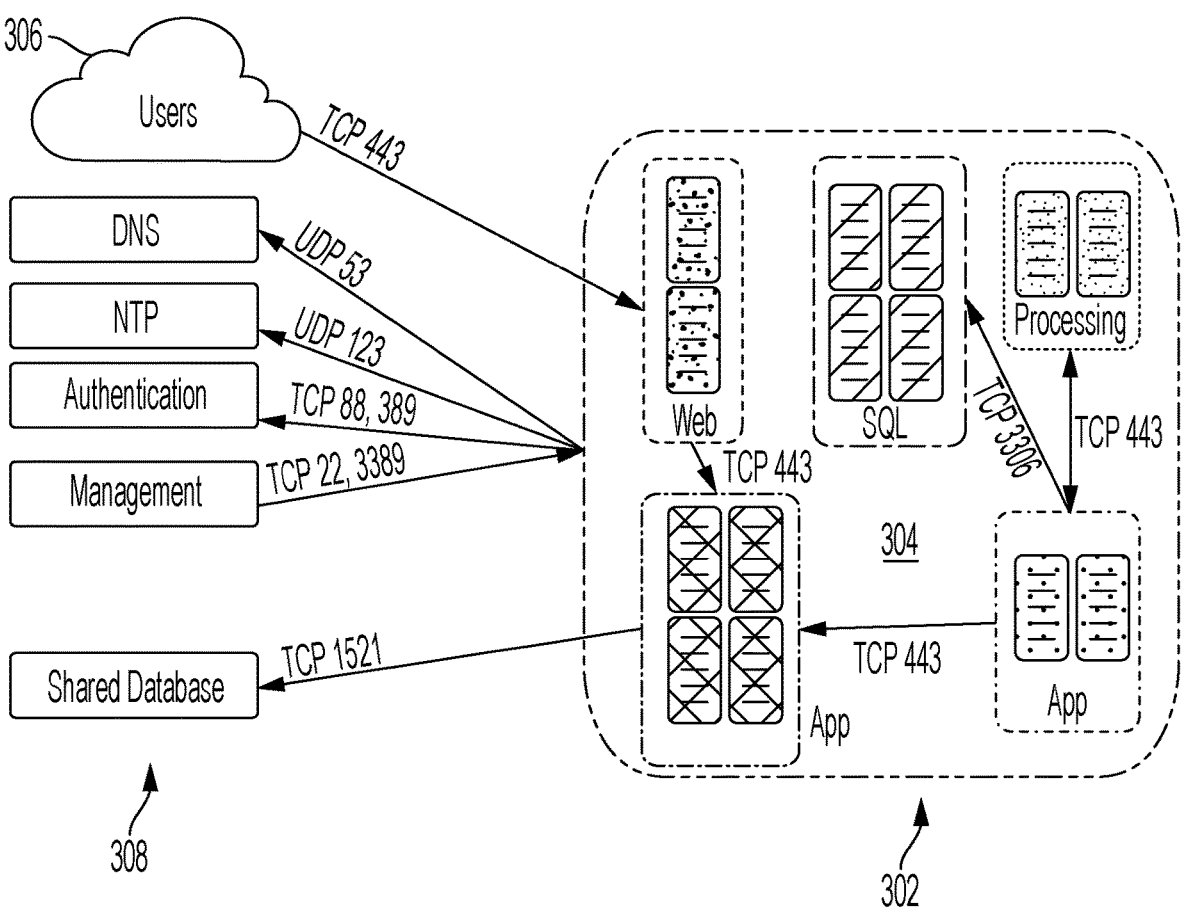
FIG. 3 shows example results of application dependency mapping, under an embodiment.

FIG. 3 shows results 300 of an ADM process. FIG. 3 show workloads and corresponding server groupings 302, dependencies among workloads 304, external dependencies 308, user interaction with workloads 306.

As seen in FIG. 2, agents may run on Linux, Windows, or AIX bare metal 212 or virtual machines 214. Virtual Machine may be on-premises or in the cloud.

The CSW Platform sends policies to the CSW agent when enforcing on the host. Agents receive optimized policies for a corresponding workload. Agent then programs policies into the native host firewall. For example, in a Linux operating system, iptables is a user-space utility program that allows a system administrator to configure the IP packet filter rules of the Linux kernel firewall. ipset is an extension to iptables that allows you to create firewall rules that match entire "sets" of addresses at once. Microsoft and AIX implement analogous host based firewalls.

Some datacenter servers may not permit agents. Physical or Virtual Appliances or any application where CSW agents cannot be deployed are referred to as appliances 210. Servers where a CSW agent is not deployed may be due to licensing, operating system, or other constraints. If agents cannot be deployed, then flow ingest from network ingest can be used to discover the policy, but not enforce in the host. Under an embodiment, ERSPAN ingest provides flow data from ACI switches. The Encapsulated Remote Switch Port Analyzer (ERSPAN) allows traffic monitoring in one network area. It uses Layer 3 routing to route the SPAN traffic to a network traffic analyzer in a different network area. An alternative embodiment may use NetFlow for analogous purposes. ACI switches are equipped with ERSPAN and/or NETFLOW functionality. In this architecture, ACI contracts are then used for agentless enforcement.

Inventory management is critical to identify the servers in an application, and their role within the application. CSW can classify inventory manually using label uploads or by integrating with Infoblox IPAM 262, ServiceNow CMDB 260, vCenter Tags, 264 or other sources where inventory is managed. Inventory services are used to configure scopes and filters in CSW. Additionally, a workspace assigned to a scope may have clusters that represent the tiering the application. The clusters can be defined using inventory services.

The CSW EDGE Virtual Appliance 208 forwards events from CSW to other services such as syslog or email.

Application Centric Infrastructure

FIG. 2 illustrates an ACI environment 201. The ACI fabric comprises Cisco Nexus switches 230 that form the foundation of the network. The switches are organized in a leaf-and-spine architecture. An Application Policy Infrastructure Controller 232 (APIC) serves as the central point of control and management for the ACI fabric. The Cisco APIC controls an ACI fabric for network virtualization and policy enforcement. This architecture focuses on policy enforcement using ACI contracts.

A Nexus Dashboard Orchestrator (NDO) 233 manages one or more ACI fabrics by interfacing with the APIC for the fabric. NDO facilitates intersight configuration to all network virtualization across multiple sites. NDO can also apply ACI contracts to the ACI fabrics it is managing. This architecture focuses on ACI contracts configured via API using the PAE to NDO interface. Under an embodiment, the PAE derives ACI filter, filter entries, contracts, and subjects from the CSW approved policy and then configures them in ACI. A filter has one or more filter entries which define the protocol and ports of permitted traffic. A contract has one or more subjects which contain filters. Once the contract is configured, PAE will assign a consumer EPG and a provider EPG to use the contract which will permit the required traffic between the consumer and providers.

Figure 7:
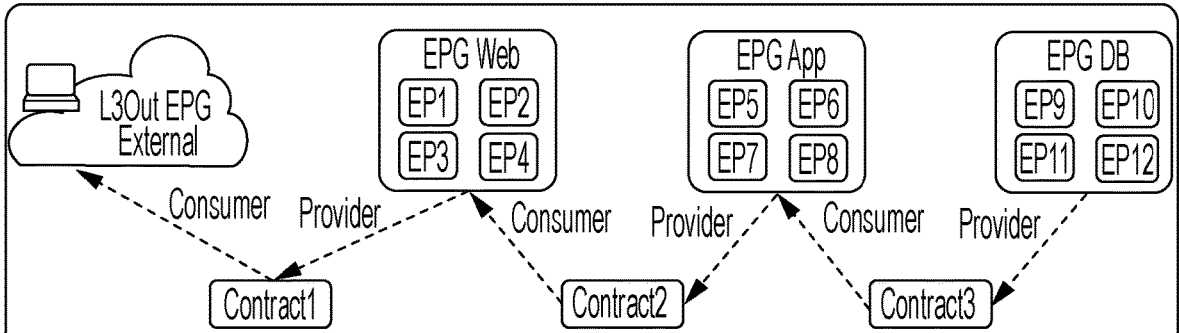
FIG. 7 shows relationships between EPGs and contracts, under an embodiment.

The fundamental security architecture of the Cisco ACI solution follows an allow-list model where it defines what traffic should be permitted. A contract is a policy construct used to define communication between EPGs. Without a contract between EPGs, no unicast communication is possible between those EPGs unless the VRF is configured in "unenforced" mode or those EPGs are in a preferred group. FIG. 7 shows the relationship between EPGs and contracts.

Figure 8:
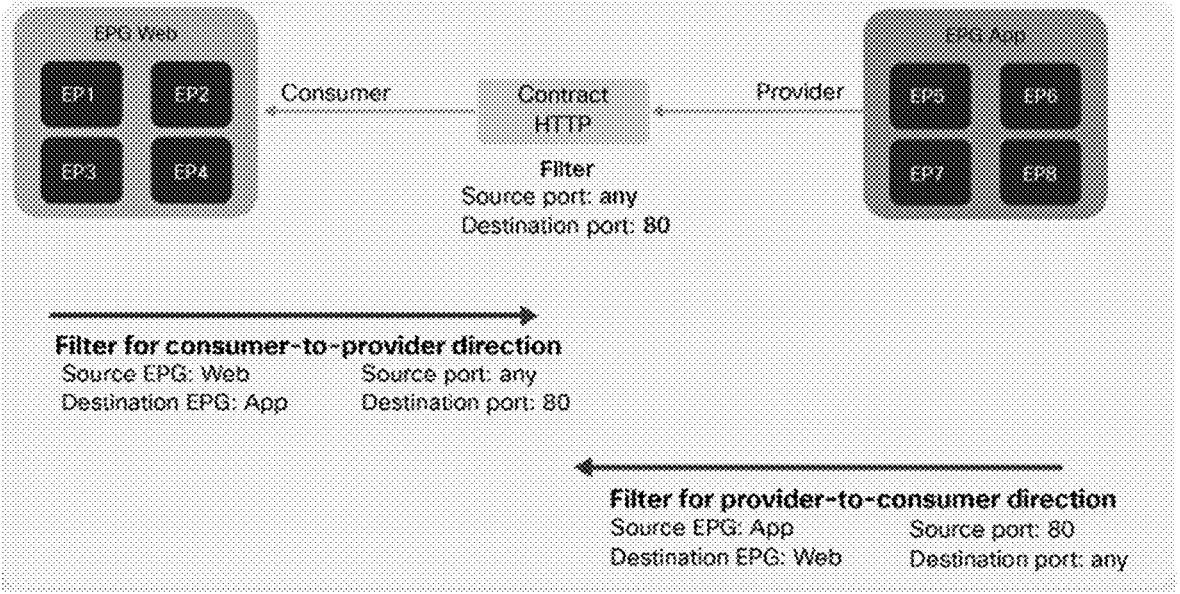
FIG. 8 shows an example contract, under an embodiment.

An EPG provides or consumes contracts. For instance, the App EPG in the example of FIG. 7 provides a contract that the Web consumes, and consumes a contract that the DB EPG provides. Defining which sides is the provider and which one is the consumer of a given contract allows establishing a direction of the contract where to apply ACL (Access Control List) filtering; for instance, if the Web EPG is a consumer of the contract provided by the App EPG, you may want to define a filter that allows HTTP port 80 as a destination in the consumer-to-provider direction and as a source in the provider-to-consumer direction. In the case of a traditional network, those two filters for both directions are separate ACLs. In the case of an ACI fabric, when a contract with an HTTP filter: source port of "Any," and a destination port of "80," is configured between Web EPG and App EPG, two filters (one per direction) are deployed in Cicso ACI by default, as show in FIG. 8.

Figure 9:
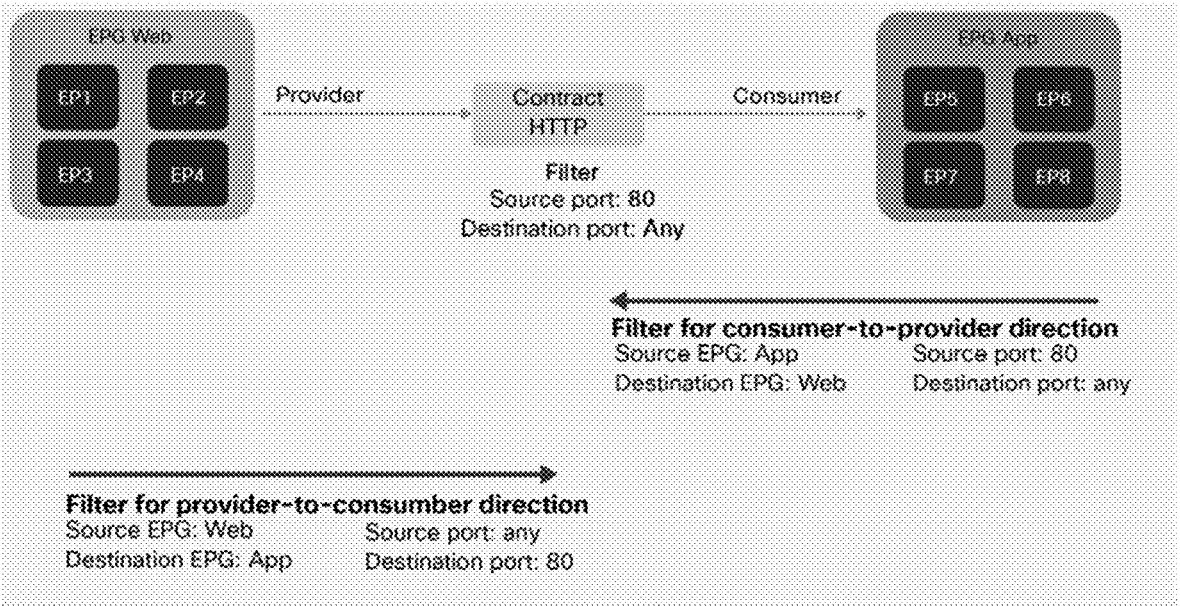
FIG. 9 shows an example contract, under an embodiment.

If, instead, one had defined Web LPG as the provider and App LPG as the consumer of the contract, one would define the same filters in the opposite direction; that is, you would allow HTTP port 80 as the source in the consumer-to-provider direction and as the destination in the provider-to-consumer direction (see FIG. 9).

In the most common designs, you do not need to define more than one contract between any EPG pair. If there is a need to add more filtering rules to the same EPG pair, this can be achieved by adding more subjects to the same contract.

Subjects and Filters

Figure 10:
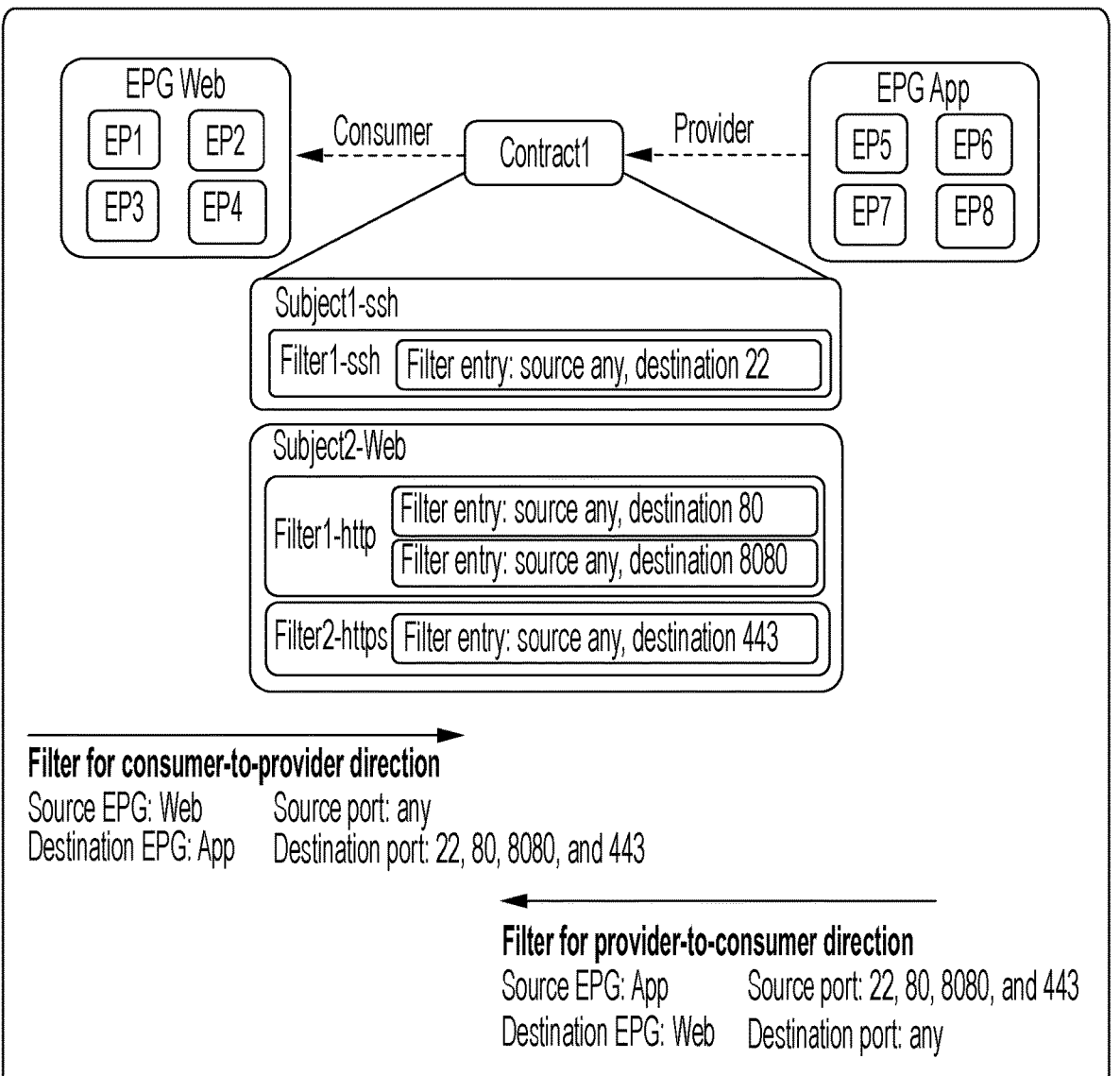
FIG. 10 shows an example contract, under an embodiment.

A subject is a construct contained within a contract and references a filter. A contract contains one or more subjects and a subject contains one or more filters. A filter contains one of more filter entries. A filter entry is a rule specifying fields such as the TCP port and protocol type. FIG. 10 illustrates the logic of subjects and filters.

Policies reside at the switch level. Therefore, a policy may be enforced before data reaches a host based firewall.

BTA Architect Explorer

The BTA Architect Explorer (AE) 250 is a multi-tenant, multi-site application running in a virtual appliance which facilitates policy automation from CSW to AC. AE requires API access to CSW(s), NDO(s), APIC(s), and network services: DNS, NTP, SMTP, and MFA (FIG. 2, 240). AE requires a certificate for https access to the WEB GUI. Unsecure http access is not supported. SSH access is required for administration. All user logons are protected by multifactor authentication MFA.

BTA AE Policy Automation Engine (PAE)

The PAE reads CSW policy and ACI configuration, then automatically configures Filters, Filter Entries, Contracts, and Subjects and applies the contracts to EPGs in ACI to enforce a policy consistent with the CSW policy for a given application.

Application Profiles and EPGs must be pre-configured ACI according to strict naming conventions. CSW scopes must match the desired naming convention in ACI since ACI objects cannot be renamed. The scope naming follows this structure which the PAE maps to ACI configuration. CSW scope name for an application: <Datacenter Name>:<Fabric Name>:<Tenant Name>:<Application Profile Name> maps to ACI Object <Datacenter Name>-<Fabric Name>-<Tenant Name>-<Application Profile Name>. For example DC1: FABRIC1:TENANT1:APP1-AP maps to dc1-fabric1-tenant1-vrf1-app1-ap. The clusters within the CSW workspace for the scope identify one or more EPGs within APP1-AP for applying contracts. Cluster and EPG name are the same in CSW and ACI: dc1-fabric1-tenant1. Typically there is a one to one relationship from Tenant to VRF. If so, vrf1 is not required in the ACI name in the example above. In the rare case of multiple VRFs per tenant, then a unique vrf name is required in the ACI name as in the example above. Note that the CSW policy names are available for automatic export after the CSW Workspace is configured for the Leaf Scope.

Both the ACI and CSW names must fully specify the named object hierarchy. CSW scopes are separated by ":" which are mapped to "-" in ACI to show separation of ACI objects. Names must not have spaces so names with multiple words use "_" instead of space between the words.

The enforced ACI policy will be broader than CSW policy in that it will allow all intra-EPG traffic. If traffic between servers in the same application must be segmented, then host enforcement using the CSW Agent must be used.

BTA AE provides reporting services. BTA AE reporting generates several reports necessary for the policy enforcement automation and validation. These reports are the record of the policy configuration before and after enforcement.

The ACI Configuration Report contains all existing configuration in ACI including Application Profiles, EPGs, Contracts, Subjects, Filters, and Filter Entries.

The CSW Policy Review report lists all discovered and configured policy in CSW. The policy review report facilitates review of the policy for the Policy Approval step in the Policy Lifecycle.

The CSW ACI Policy Validate report identifies all the required ACI configuration to enforce a consistent policy in ACI. If required objects such as Application Profiles or EPGs are misnamed or missing, then validation will fail. Validation failure indicates updates are required in ACI configuration and/or CSW configuration are required before proceeding with enforcement. The CSW ACI Policy Validation Report after enforcement should indicate no additional configuration required confirming that all required objects are configured and applied in ACI.

The CSW Enforcement Checklist Report confirms that all required CSW configuration is in place before enforcing the policy in CSW.

The CSW Escape Report lists the traffic that will be dropped once the policy is enforced. This is needed for final verification that no needed traffic will be dropped after enforcement.

The CSW Reject Report lists the traffic that is rejected after enforcement and can be used for troubleshooting applications after enforcement or identify new traffic that may need to be allowed.

Application Ranking

Applications must be priority ranked for segmentation not only to sequence the segmentation activity but also to consider CSW licensing and ACI TCAM resource limitations. Within an application there may be multiple environments: Prod, Dev, Test, QA, Staging, . . . . The environment for each application should be segmented starting with dev to prevent issues from dev propagating through the environments to production and to provide full visibility to zone crossings during Policy Approval.

TCAM, Ternary Content Addressable Memory, also known as overflow TCAM (OTCAM) is a specialized hardware resource designed for rapid table lookups. Each switch comprises a TCAM resource in the form of a microprocessor that manages TCAM for every port on the switch or groupings of ports. TCAM has the ability to perform bulk searches of content with matches based on 0's, 1's and * (wild card). For each packet, the switch identifies the direction ingress or egress, the consuming EPG, providing EPG, the contract associated with the consumer and provider EPG combination, and the protocol and ports permitted in the contract. If the packet is not permitted, it is dropped by the switch.

TCAM is a precious hardware resource of ACI Nexus switches. Usage of these hardware resources are therefore planned with great care. In an environment that implements complex policy relationships (particularly if policies are simultaneously concentrated on a few switches), ACI policy enforcement can easily hit the policy CAM limit and exhaust the hardware resource. If the resources are exhausted additional policies/contracts won't be programmed on the hardware. As a result, the system will see unexpected behaviors.

Figure 4:
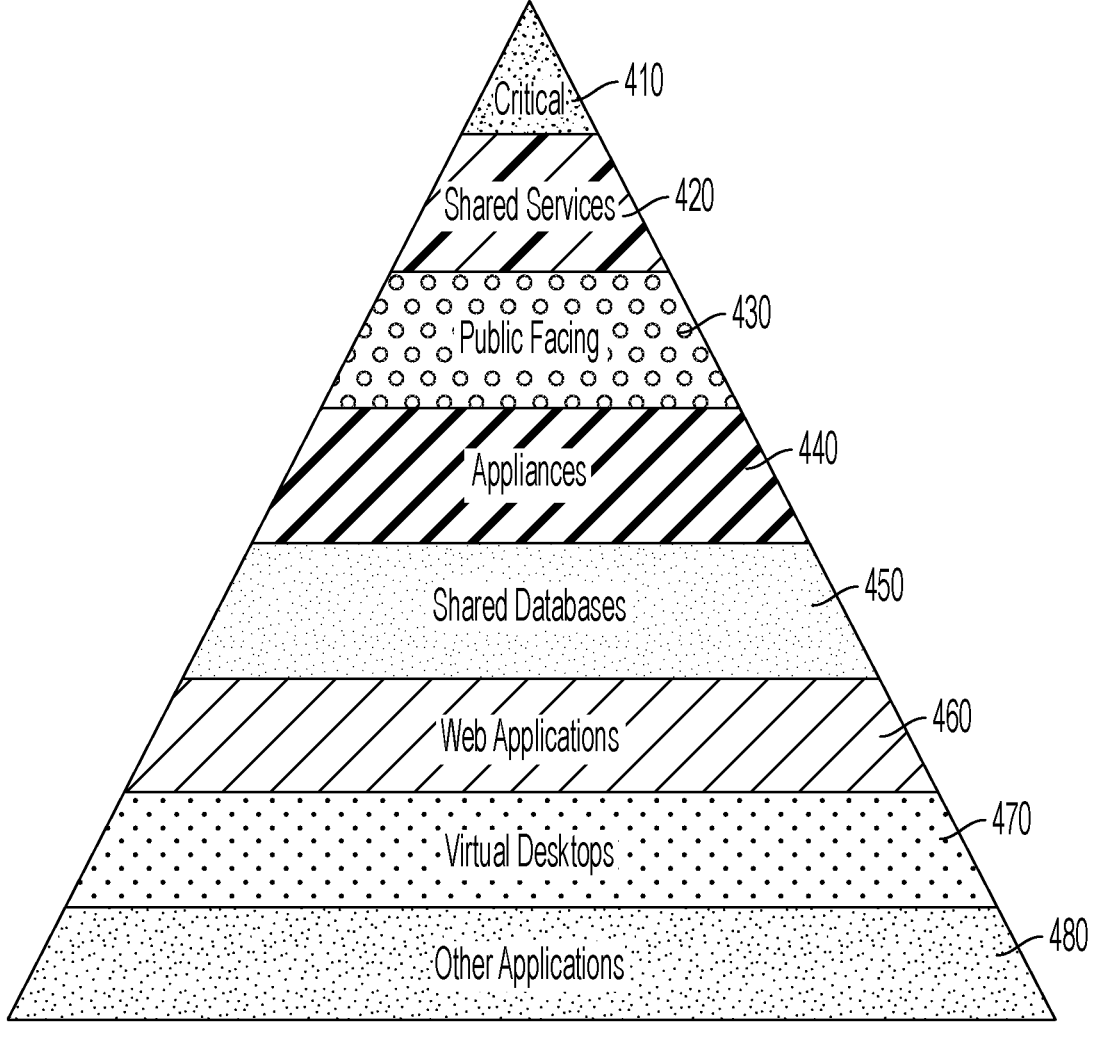
FIG. 4 shows an application hierarchy, under an embodiment.

Under an embodiment, FIG. 4 shows datacenter applications listed in hierarchy according to importance. Multiple Applications exist within each layer. The hierarchy comprises:

Critical Applications 410 which are the crown jewels of the business and/or have strict compliance requirements.

Shared Service Applications 420 that are broadly used by most or all datacenter applications and users. Some typical shared service applications are: Active Directory, Jumphosts, Key Server, DNS, NTP, Mail, . . . (Jumphosts are used for management and testing)

Public facing applications 430 have public Internet addresses assigned to one or more servers.

Appliances or other servers 440 where CSW Agents cannot be deployed.

Shared Databases 450 used by many applications or users.

Web Applications 460.

Virtual Desktops 470 which have a daily or other periodic lifecycle.

Other Applications 480.

Application Criticality Metric

The goal of application ranking is to create an ordered list of Application+Environment (AppEnv) which defines which applications will be segmented first. Information is discovered during the application segmentation workflow which may cause re-ranking of the applications. Some discovered things which may affect ranking are: Unlisted Applications, Application Server Count (APC), Application Breadth, Environment Crossing, or TCAM percent utilization.

The applications are segmented in order until resources are consumed. The primary resources are software agent licenses and/or TCAM in the switching infrastructure, but other resources may come in to play as well. Once the resource limit is reached the more critical applications are segmented. Resources could be added or freed up at which point re-ranking and further segmentation commence.

| Term | Acronym | Definition |
|---|---|---|
| Segmentation | | Enforcing policy rules to limit traffic to or from a server to only that traffic that is needed for application operation including functionality, testing, administration, availability, and any other needed operations. |
| Host Enforcement Agent | HEA | Software agent installed in a server operating system which enforces segmentation in the host firewall of the server operating system. CSW Enforcement Agent is an HEA |
| Environment | ENV | The runtime environment of the application: Production, Test, Quality Assurance (QA), Staging, Development, . . . |
| Application + Environment | AppEnv | A set of servers for one environment for one application. This set will be segmented together, For example, Exchange Production would be Exchange_Prod Every application has at least 1 environment |
| TCAM | TCAM | Limited hardware resource for enforcing policy in switching infrastructure |

The following metrics are inputs to Application Ranking.

| Metric | Acronym | Description | Range |
|---|---|---|---|
| Application Server Count | ASC | Number of servers in the AppEnv | 1 to N |

-continued

| Metric | Acronym | Description | Range |
|---|---|---|---|
| Application Address Count | AAC | Number of addresses assigned to all servers in AppEnv | MIN(ASC, 1 to N) |
| Application Type | APT | Indicates if Host Enforcement Agent (HEA) is supported by the application servers.<br>APT = Server indicates HEA is supported<br>APT = Appliance indicates HEA not supported | Server, Appliance |
| Application Criticality | ACM | Indicates how critical the AppEnv is to the success of the business.<br>The metric assigned should consider the environment of the AppEnv.<br>For example, Exchange_PROD may be more critical than Exchange_DEV<br>ACM = 1 is most critical and indicates significant losses if AppEnv fails and business failure if failure persists over time<br>ACM = 5 is least critical and indicates no impact to the business if AppEnv fails<br>AppEnv with ACM = 5 should be considered for decommissioning.<br>Typically, DNS has ACM = 1 | 1 to 5 |
| Application Breadth | ABM | Indicates how broadly users and other applications depend on the application.<br>ABM = 1 indicates AppEnv provides services for most if not all users and applications<br>ABM = 5 indicates AppEnv is isolated with few or no users or applications depending on the application.<br>Typically, Microsoft Active Directory has an ABM = 1<br>Typically, Root Certificate Authority has an ABM = 5 | 1 to 5 |
| Maximum Server Licenses | MSL | Total number of licenses for HEAs. For example, the number of purchased server licenses. | 1 to N |
| Maximum Address Licenses | MAL | Total number of licenses based address count | 1 to N |
| TCAM percent utilization | TPU | Percent utilization of TCAM on a particular switch. | 0 to 100 |
| MAX TCAM percent utilization | MTPU | Maximum TPU across all switches | 0 to 100 |
| MIN TCAM utilization | | Minimum TPU across all switches | 0 to 100 |
| Environment Crossing | ECM | This metric indicates of AppEnv depends on other environments. | TRUE, FALSE |

Applications are ranked as follows . . . .
1. List all known applications with the environments. This is the list of AppEnvs. Bear in mind, little or nothing may be known. The segmentation process can start with a single server and through discovery and consultation with business owners build the list of AppEnvs.
2. Assign metrics to each AppEnv.
The assignment need not be precise. Discovery will provide more information which may require a metric change
3. Group AppEnvs according to ACM.
All AppEnvs with ACM=1 are in GroupACM1. Same for other ACM values.
4. Order the AppEnvs within each group according this prioritized list:
   a. Environment=Production
   b. If same Environment, lowest ASC
   c. If same ASC, lowest AAC
   d. If same AAC, lowest ABM
After production do the same for other environments.
At this point the Applications are ranked in an ordered list indicating which ones to segment first.

Under an embodiment, a prioritized list of environments, highest to lowest, comprises Production, Quality Assurance (QA), Test, and Development. Under an embodiment, there is further prioritization as follows: in Production: Mission Critical, Customer Facing, Internal, and within Mission Critical: Regulatory Compliant, Security Certified PCI, Audit Ready, Industry certified.

Reranking is done when a new application (one not already on the list) is added or discovered, or when a metric changes. Metrics may change over time due to server discovery, policy discovery, new business requirements or challenges, funding, other events. Re-ranking may require some applications to be unsegmented to free up resources for segmenting an application higher up in the new ranking.

Application Type (AppType) is either Server or Appliance. An application may be an appliance for a variety of reasons such as (1) Delivered as OVA, (2) Physical Appliance with no access to Operating System (OS), (3) OS not supported by HEA.

As indicated above a Policy Lifecycle is implemented by Architect Explorer (AE). The Policy Lifecycle identifies all the steps necessary to discover, approve, analyze, and enforce policy. Depending on the application segmented, the Policy Enforcement Points (PEPs) will be in the host firewall, ACI contracts, or both. The BTA Policy Automation Engine (PAE) in Architect Explorer (AE) automates the policy enforcement in ACI to ensure that host firewall and ACI policies are consistent.

Inputs of Policy Lifecycle

List of Applications

Create a list of applications which require segmentation. For each application in the list 1. List the IP addresses assigned to the application.

2. Identify the environment for IP address: Production or Non-production.

a. Optionally for NON-PRODUCTION, further clarify the environment: Development, Test, QA, Staging, . . . .

Each Application+Environment must have at least 1 IP address listed.

This process may start with a single server for one application and create the overall list over time by discovering other servers and consulting with business owners to identify the applications for discovered servers.

Outputs of Policy Lifecycle

Application segmentation policy enforced at one or more Policy Enforcement Points and enforced consistently if multiple enforcement points.

Report traffic rejected by enforced policy.

Figure 5:
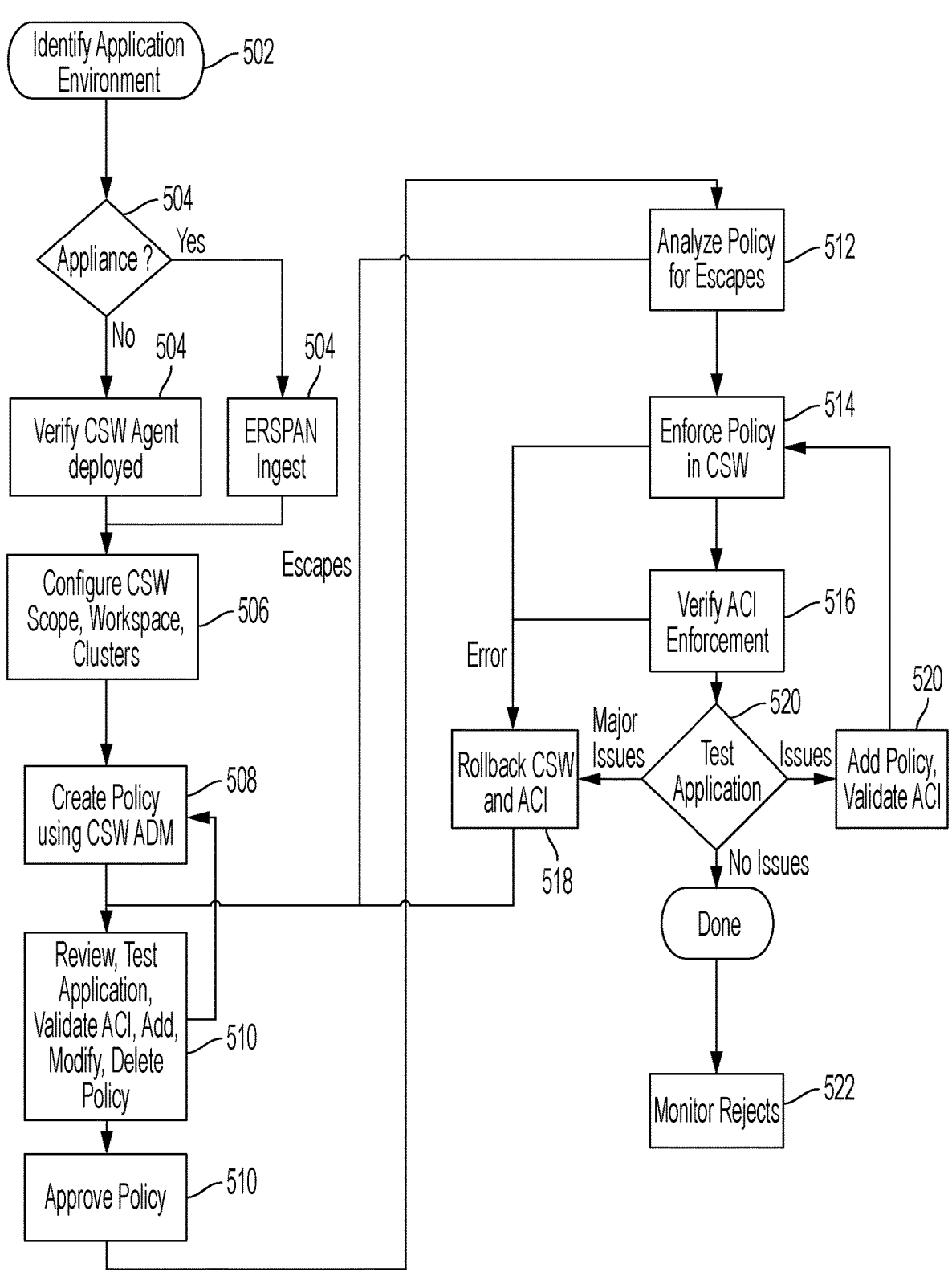
FIG. 5 shows a policy lifecycle, under an embodiment.

Steps of Policy Lifecycle (FIG. 5)

Select Application+Environment for Segmentation (FIG. 5, 502)

Inputs

List of Applications with environments and IP addresses for environments.

Actions

Rank the list according to the application categories list using Application Ranking.

Select the highest ranking application for segmentation.

Multiple applications can follow this process at the same time, no need to serialize them.

Outputs

Name of an application to segment.

Start Flow Collection (FIG. 5, 504)

Enable flow collection for any network traffic which contains one of the IP addresses in the Application.

Deploy CSW agent to report flows from the servers to the CSW platform.

Deploy CSW ingest appliance to report flows from the infrastructure to the CSW platform.

Configure Application in CSW Platform (FIG. 5, 506)

CSW Scopes are configured in a hierarchical manner to reflect Data Center, the ACI Fabric, the ACI Tenant, Environment, Application, and ACI EPGs.

Each node in the scope tree contains a set of discovered IP addresses. The Root scope contains all discovered address. A child scope contains fewer addresses than the parent, until you reach a leaf scope which has no children.

Figure 6:
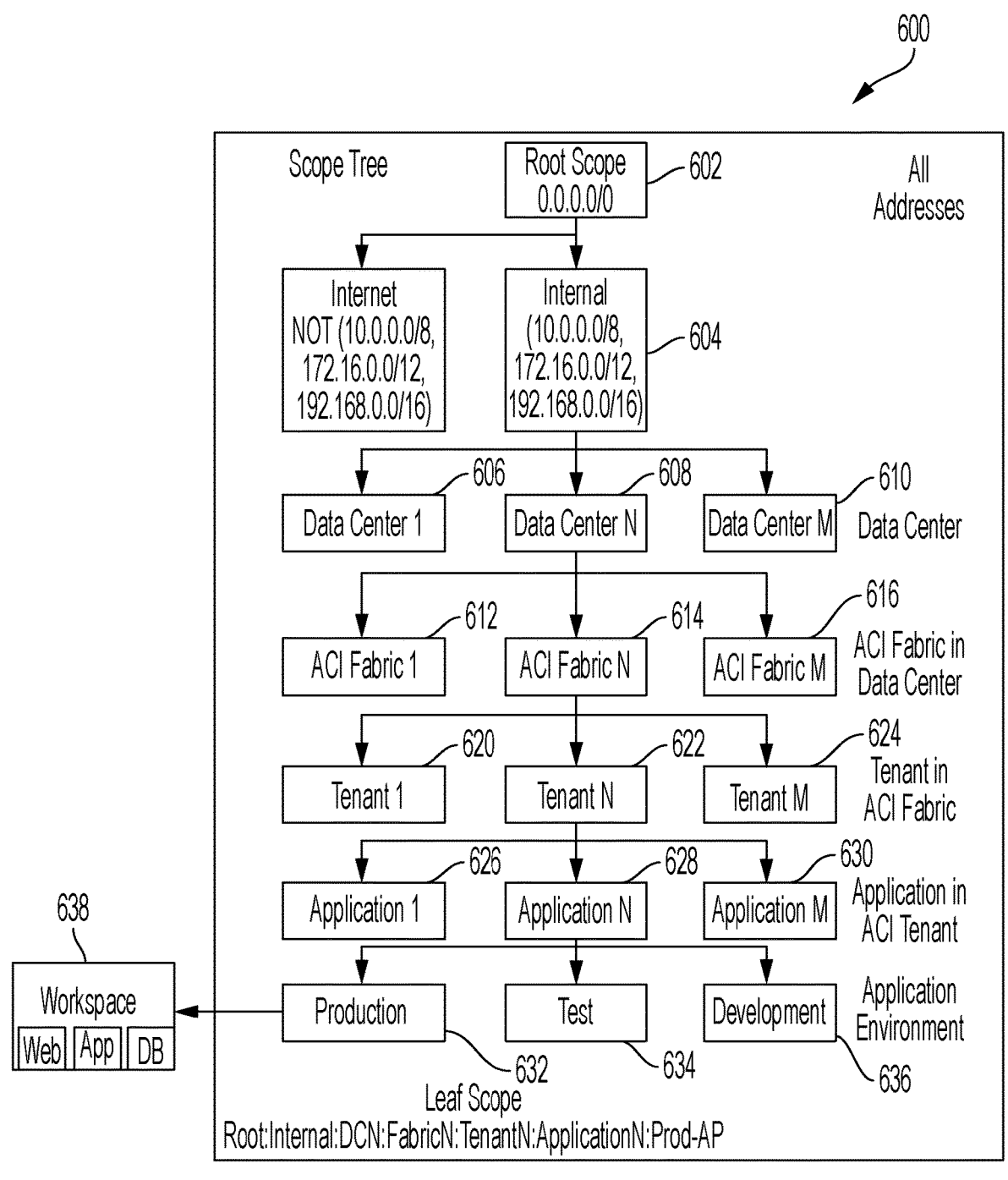
FIG. 6 shows a scope tree, under an embodiment.

FIG. 6 shows an example scope tree 600, under an embodiment. As seen in FIG. 6, child node (internal) 604 features an IP address subset of root node 602 IP addresses. In like fashion, FIG. 6 illustrates child node collections of IP addresses corresponding to data centers 606, 608, 610. ACI fabrics 612, 614, 616 cascade from data center 608; tenants 620, 622, 624 cascade from application 614; applications 626, 628, 630 cascade from tenant 622; application environments 632, 634, 636 cascade from application 628 at the leaf scope level.

A leaf scope contains the servers for a given Application+ Environment.

A CSW Workspace is configured for the Leaf Scope.

Within this workspace CSW clusters are configured for each EPG in the Application. Typically the EPGs reflect the tiers of the application, Web, App, DB (see FIG. 6, 638), but are not required to follow this convention. A single EPG may represent all servers in the AppEnv.

The CSW cluster name must have a matching ACI EPG.

Once the Leaf Scope, Workspace, and Workspace clusters are configured, policy can be discovered which reflects traffic between the application servers (intra-application) and traffic to other applications (inter-application).

If the EPGs reflect tiers of the application, an EPG may serve as a policy provider or consumer to other applications to segment inter-application flows. The same EPG could be provider or consumer to other EPGs in the same application to segment intra-application flows. If there is traffic within the EPG, policy will be discovered showing the same EPG as both provider and consumer. CSW will enforce intra-epg segmentation, but PAE will typically ignore the intra-epg policy when enforcing in ACI. Optionally, PAE can enforce intra-EPG for some applications such as appliances where CSW will not enforce policy. Where a single EPG contains all the servers in the application, there is no tiering in the application. Segmentation is only inter-application or, optionally, intra-epg, but not inter-EPG.

Discover Application Policy (FIG. 5, 508)

Generate a segmentation policy based on flows related to the IP addresses in the application.

Consider all flows for a predetermined period to include daily, weekly, and monthly seasonality. In the illustrated embodiment, the predetermined period is 5 weeks duration of operational use of the application to be segmented.

Execute CSW Application Dependency Mapping on the Application Workspace for the predetermined duration period. Preferably, a duration of at least 5 weeks.

Functional, backup, failover, mobility, or other testing should be done during policy discover to ensure the policy will permit what testing requires.

Review, Configure, and Approve Application Policy (FIG. 5, 510)

For each policy, determine if the traffic is needed or not. If needed, approve the policy, if not delete the policy.

The approved policy should permit all the traffic for the application to operate including functional traffic, administrative traffic, and testing traffic.

All policies are whitelist policies which means there are only permits with a catch all drop. No explicit deny policies.

BTA AE validates the CSW Policy with the ACI configuration by reading the configuration from CSW and ACI, matching the Scope Names in CSW with Tenant, Application Profile, and EPG names in ACI. This is essentially a matching exercise. The names are read from CSW and ACI. CSW names are modified, ":" to -, spaces to "_", . . . and matched to existing ACI names. If all policies in a workspace have matching information in ACI, the policy is Valid. If some do not match, they CSW policy may be deleted if that traffic is not needed, or additional configuration in ACI or CSW is required.

Once all policies in the workspace are approved, and validated with ACI, policy approval is complete.

Policy approval could take a few days, weeks, or months depending the span of time required to capture seasonal traffic which may be daily, weekly, monthly, quarterly, or yearly seasonality.

Analyze Policy (FIG. 5, 512)

Simulate the approved policy against current or historic net flow data to identify what will be dropped (CSW Escapes). Review the escapes to see if they should be permitted. If permitted, go back to configuration to the prior step to update the policy configuration and validate with ACI.

Policy Analysis should occur for a predetermined period depending on urgency and criticality of segmenting the application. In an illustrative embodiment, the predetermined analysis period is selected in a range of 1 to 7 days.

Enforce Policy (FIG. 5, 514)

After Analyze Policy is complete, the policies are ready to be enforced. The enforcement is done during a scheduled enforcement window of time for CSW, ACI, and other enforcement points. These could all be done in the same enforcement window or scheduled for different times.

Either an operator enables enforcement using the CSW GUI during the window, or BTA AE is configured to enforce during the window using the CSW API. CSW Enforcement is always done first.

BTA AE is triggered to enforce in ACI, Firewall, or other enforcement points using 2 methods: Polling or Event. If Polling, BTA AE is periodically polling the CSW API for enforced applications. The polling interval could be a few seconds to a few minutes. If event driven, CSW will send a syslog or kafka event to BTA AE.

As CSW begins to enforce the policies, BTA is aware of them through either polling or event, i.e. by notification from CSW. BTA AE is then triggered to enforce in ACI. Under an embodiment, this implementation is ACI only. However, BTA AE is not limited to just ACI. Under alternative embodiments, other enforcement points including Firewalls or other switching infrastructure are integrated via their API. Similar naming or new name mappings are implemented for these other enforcements points.

Once BTA AE detects a CSW enforced application, by polling or event, it validates the CSW Policy with ACI. If validation succeeds, the ACI filters and contracts are configured to enforce the policy in ACI. BTA configures the contracts in ACI using the NDO API or APIC API. The mapped ACI naming includes all information required to configure the contract in ACI, and the contract configuration process is entirely automated.

BTA Architect Explorer enforces consistency by automatically enforcing policy from CSW to ACI.

Verify Policy Enforcement at all Enforcement Points (FIG. 5, 516)

Once the policy is enforced at a given enforcement point, the BTA AE reads the policy back and compares to the enforced policy to validate in an automated process.

This step is needed to account for any bug or unforeseen issue in the system. In most if not all cases, the policy read back should match the policy deployed, but if there is a bug in any of the components, or communication failure between them, the policy may not be fully or accurately configured. This must be detected, so the policy can be rolled back since the policy must be applied as a whole and not portions of it.

Any difference in the enforced policy and the read policy is/must be considered. As one example, consider a bug in the ACI enforcement, where the API indicates successful enforcement, but the policy is not actually configured. This process occurs at the CSW and ACI level.

Enforced=Read–Validation Success

Enforced is narrower than Read–Validation Warning— some unneeded traffic may be allowed but all needed traffic will be allowed.

Read narrower than Enforced–Validation Error—some needed traffic may be dropped.

Read missing–Validation Error—no policy applied.

Validation Error will cause rollback of the policy at all enforcement points.

Validation Warning may cause rollback of the policy depending on configuration.

Rollback (FIG. 5, 518)

Rollback the policy to the previous version and validate that what is enforced after rollback matches the previous version.

Rollback error indicates rollback does not match the previous version and indicates the differences in Previous Version and Current version (after rollback).

Application Testing (FIG. 5, 520)

After enforcement but while during the enforcement change window, test the application. If the test fails, verify that the test was successful during policy discovery. If test was not done during policy discovery consider rolling back.

If rollback is not an option, add policies to allow the needed traffic and enforce. The added policies are automatically approved.

Once testing passes, enforcement is complete.

FIGS. 11A-11C show the policy to be enforced. The workspace (Application) for the leaf scope is APP1-PROD. The workspace DC1-COMMON has policies discovered in APP1-PROD (and other leaf scope workspaces) which are common to most if not all servers in the datacenter. So the combined policies in the Review tab will be processed by BTA AE PAE and enforced in ACI. FIGS. 12A-12D show the enforced contract and illustrate the mapping of CSW to ACI naming convention.

The CSW policies in FIGS. 11A-11C have one row for each unique combination of consumer, provider, protocol, and port. Rows with the same consumer and provider map to a single contract in ACI, see FIGS. 12A-12D, which has multiple filters, one for each port. In some cases where a provider provides services for many consumers, one contract is created for the provider with a filter added for each port to the contract.

In embodiments, a method comprises one or more applications running on at least one processor for segmenting applications in a networked environment, the one or more applications communicatively coupled with the applications, the one or more applications providing receiving network flow information of the applications from at least one source, using the network flow information to discover a plurality of policies in a first policy enforcement environment, receiving the discovered plurality of policies in a first format according to a first policy naming convention, mapping the discovered plurality of policies from the first format to a second format following a second policy naming convention, enforcing at least a portion of the discovered plurality of policies in the first policy enforcement environment using the first format, and enforcing at least a portion of the discovered plurality of policies in a second policy enforcement environment using the second format.

In embodiments, the first policy enforcement environment comprises a Cisco Secure Workload (CSW) environment.

In embodiments, the second policy enforcement environment comprises an Application Centric Infrastructure (ACI) environment.

In embodiments, CSW agents are deployed to servers hosting at least a portion of the applications, wherein the at least one source comprises the CSW agents.

In embodiments, the network flow information comprises network activity of applications reported by corresponding CSW agents.

In embodiments, the ACI environment comprises network switches, wherein an Encapsulated Remote Switch Port Analyzer (ERSPAN) resides on and monitors traffic of each network switch, wherein the at least one source comprises the ERSPANs.

In embodiments, the network flow information comprises an export from the ERSPANs.

In embodiments, the discovering the policies comprises applying a CSW application dependency mapping (ADM) to the applications using the network flow information, wherein the ADM discovers and visualizes dependencies among groupings of the applications.

In embodiments, the CSW agents enforce at least a portion of the discovered policies at the host firewall level.

In embodiments, the first format comprises a CSW environment naming convention.

In embodiments, the second format comprises an ACI environment naming convention.

In embodiments, the mapping comprises translating the discovered policies from the first naming convention to the second naming convention, wherein the second naming convention defines contracts in the ACI environment.

In embodiments, the contracts comprise filters defining protocols and ports of permitted network traffic among groupings of applications.

In embodiments, the discovering includes prioritizing applications for segmentation, wherein each application corresponds to an environment.

In embodiments, the prioritizing comprises assigning application metrics to each application/environment (app/env) combination.

In embodiments, the application metrics comprise application criticality (ACM), wherein ACM indicates on a scale one to five how critical the app/env is to an enterprise served by the networked applications, with a score of one indicating the highest criticality.

In embodiments, the application metrics comprise application server count (ASC), wherein ASC comprises the number of servers corresponding to the app/env combination.

In embodiments, the application metrics comprise application address count (AAC), wherein AAC comprise the number of internet protocol addresses assigned to the app/env combination.

In embodiments, the application metrics comprise application breadth (ABM), wherein ABM indicates on a scale of one to five the dependency of other applications on the app/env combination, with a score of one indicating the greatest dependency.

In embodiments, the prioritizing comprises grouping app/env combinations by ACM score.

In embodiments, the prioritizing comprises selecting the most critical grouping according to ACM score.

In embodiments, the prioritizing comprises further subgrouping applications the selected grouping according to environment.

In embodiments, the prioritizing comprises selecting the most critical subgrouping.

In embodiments, the prioritizing comprises ranking applications in the subgrouping from lowest to highest ASC score.

In embodiments, the prioritizing comprises further ranking applications in the subgrouping with a common ASC score from lowest to highest AAC score.

In embodiments, the prioritizing comprises further ranking applications in the subgrouping with a common AAC score from lowest to highest ABM score.

In embodiments, the prioritizing comprises iteratively selecting the next most critical subgrouping of applications and performing the further ranking of applications in that subgrouping.

In embodiments, the prioritizing comprises iteratively selecting the next most critical grouping according to ACM score and performing the further ranking of applications in the corresponding subgroupings.

In embodiments, the segmentation proceeds until Ternary Content Addressable Memory resources of the ACI environment switches are exhausted.

In embodiments, the method further comprises analyzing the plurality of discovered policies prior to enforcement in the second policy enforcement environment.

In embodiments, the analyzing comprises applying the plurality of discovered policies to historical netflow data in the second policy enforcement environment and identifying unexpected drops.

The systems and methods for applying policies in a datacenter environment can be a component of a single system, multiple systems, and/or geographically separate systems. The systems and methods for applying policies in a datacenter environment can also be a subcomponent or subsystem of a single system, multiple systems, and/or geographically separate systems. The components of systems and methods for applying policies in a datacenter environment can be coupled to one or more other components (not shown) of a host system or a system coupled to the host system.

One or more components of the systems and methods for applying policies in a datacenter environment and/or a corresponding interface, system or application to which the systems and methods for applying policies in a datacenter environment is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that includes systems and methods for applying policies in a datacenter environment can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or backend networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods for applying policies in a datacenter environment and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, Systems on a Chip (SOCs) as well as application specific integrated circuits (ASICs). Some other possibilities for implementing aspects of the systems and methods for applying policies in a datacenter environment and corresponding systems and methods include: microcontrollers with memory (such as electronically erasable programmable read only memory (EEPROM)), embedded microprocessors, firmware, software, etc. Furthermore, aspects of the systems and methods for applying policies in a datacenter environment and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods for applying policies in a datacenter environment is not intended to be exhaustive or to limit the systems and methods to the precise forms disclosed. While specific embodiments of, and examples for, the systems and methods for applying policies in a datacenter environment and corresponding systems and methods are described herein for illustrative purposes, various equivalent modifications are possible within the scope of the systems and methods, as those skilled in the relevant art will recognize. The teachings of the systems and methods for applying policies in a datacenter environment and corresponding systems and methods provided herein can be applied to other systems and methods, not only for the systems and methods described above.

The elements and acts of the various embodiments described above can be combined to provide further embodiments. These and other changes can be made to the systems and methods for applying policies in a datacenter environment and corresponding systems and methods in light of the above detailed description.

The invention claimed is:

1. A method comprising, one or more applications running on at least one processor for performing segmentation of a plurality of applications in a networked environment, the one or more applications communicatively coupled with the plurality of applications, the one or more applications for providing, receiving network flow information of the plurality of applications from at least one source;

using the network flow information to discover a plurality of policies in a first policy enforcement environment, wherein the discovering the plurality of policies comprises applying a Cisco Secure Workload (CSW) application dependency mapping (ADM) to the plurality of applications using the network flow information, wherein the discovering includes prioritizing the plurality of applications for segmentation, wherein each application corresponds to a runtime environment in the networked environment;

wherein the prioritizing comprises assigning application metrics to each application/runtime environment (app/env) combination, wherein the application metrics comprise application breadth for each respective app/env combination, wherein the application breadth indicates dependence of other applications of the plurality of applications upon the respective app/env combination;

receiving the discovered plurality of policies in a first format according to a first policy naming convention;

mapping the discovered plurality of policies from the first format to a second format following a second policy naming convention;

enforcing at least a portion of the discovered plurality of policies in the first policy enforcement environment using the first format, wherein the enforcing comprises allowing first network traffic in the first policy enforcement environment to be forwarded only to the plurality of applications as permitted by the at least a portion of the discovered plurality of policies using the first format; and enforcing at least a portion of the discovered plurality of policies in a second policy enforcement environment using the second format, wherein the enforcing comprises allowing second network traffic in the second policy enforcement environment to be forwarded only to the plurality of applications as permitted by the at least a portion of the discovered plurality of policies using the second format.

2. The method of claim 1, wherein the first policy enforcement environment comprises a CSW environment.

3. The method of claim 2, wherein the second policy enforcement environment comprises an Application Centric Infrastructure (ACI) environment.

4. The method of claim 3, wherein CSW agents are deployed to servers hosting at least a portion of the plurality of applications, wherein the at least one source comprises the CSW agents.

5. The method of claim 4, wherein the network flow information comprises network activity of applications reported by corresponding CSW agents.

6. The method of claim 5, wherein the ACI environment comprises network switches, wherein an Encapsulated Remote Switch Port Analyzer (ERSPAN) resides on and monitors traffic of each network switch, wherein the at least one source comprises the ERSPANs.

7. The method of claim 6, wherein the segmentation proceeds until Ternary Content Addressable Memory resources of the ACI environment switches are exhausted.

8. The method of claim 7, further comprising analyzing the plurality of discovered policies prior to enforcement in the second policy enforcement environment.

9. The method of claim 8, wherein the analyzing comprises applying the plurality of discovered policies to historical netflow data in the second policy enforcement environment and identifying unexpected drops.

10. The method of claim 6, wherein the network flow information comprises an export from the ERSPANs.

11. The method of claim 10, wherein the ADM discovers and visualizes dependencies among groupings of the plurality of applications.

12. The method of claim 11, wherein the CSW agents enforce at least a portion of the discovered plurality of policies at a host firewall level.

13. The method of claim 12, wherein the first format comprises a CSW environment naming convention.

14. The method of claim 13, wherein the second format comprises an ACI environment naming convention.

15. The method of claim 14, wherein the mapping comprises translating the discovered plurality of policies from the first naming convention to the second naming convention, wherein the second naming convention defines contracts in the ACI environment.

16. The method of claim 15, wherein the contracts comprise filters defining protocols and ports of permitted network traffic among groupings of the plurality of applications.

17. The method of claim 1, wherein the application metrics comprise application criticality (ACM), wherein the ACM indicates on a scale one to five how critical the app/env is to an enterprise served by the plurality of applications, with a score of one indicating the highest criticality.

18. The method of claim 17, wherein the application metrics comprise an application server count (ASC), wherein the ASC comprises a number of servers corresponding to the app/env combination.

19. The method of claim 18, wherein the application metrics comprise an application address count (AAC), wherein the AAC comprises a number of internet protocol addresses assigned to the app/env combination.

20. The method of claim 19, wherein the application breadth comprises a scale of one to five with a score of one indicating the greatest dependency.

21. The method of claim 20, wherein the prioritizing comprises grouping app/env combinations by the ACM score.

22. The method of claim 21, wherein the prioritizing comprises selecting a most critical grouping according to the ACM score.

23. The method of claim 22, wherein the prioritizing comprises further subgrouping applications in the selected grouping according to environment.

24. The method of claim 23, wherein the prioritizing comprises selecting a most critical environment subgrouping according to a priority.

25. The method of claim 24, wherein the prioritizing comprises ranking applications in the environment subgrouping from lowest to highest ASC score.

26. The method of claim 25, wherein the prioritizing comprises further ranking applications in the environment subgrouping with a common ASC score from lowest to highest AAC score.

27. The method of claim 26, wherein the prioritizing comprises further ranking applications in the environment subgrouping with a common AAC score from lowest to highest application breadth score.

28. The method of claim 27, wherein the prioritizing comprises iteratively selecting the next most critical environment subgrouping of applications and performing the further ranking of applications in that environment subgrouping.

29. The method of claim 28, wherein the prioritizing comprises iteratively selecting the next most critical grouping according to the ACM score and performing the further ranking of applications in the corresponding subgroupings.

* * * * *